(12) United States Patent
Ling et al.

(10) Patent No.: US 10,832,028 B2
(45) Date of Patent: Nov. 10, 2020

(54) OPTICAL FINGERPRINT MODULE

(71) Applicant: SHANGHAI OXI TECHNOLOGY CO., LTD, Shanghai (CN)

(72) Inventors: Yan Ling, Shanghai (CN); Hong Zhu, Shanghai (CN)

(73) Assignee: SHANGHAI OXI TECHNOLOGY CO., LTD, Shanghai (CN)

( * ) Notice: Subject to any disclaimer, the term of this patent is extended or adjusted under 35 U.S.C. 154(b) by 146 days.

(21) Appl. No.: 16/083,410

(22) PCT Filed: Aug. 18, 2016

(86) PCT No.: PCT/CN2016/095822
§ 371 (c)(1),
(2) Date: Sep. 7, 2018

(87) PCT Pub. No.: WO2017/156975
PCT Pub. Date: Sep. 21, 2017

(65) Prior Publication Data
US 2019/0087627 A1   Mar. 21, 2019

(30) Foreign Application Priority Data

Mar. 16, 2016 (CN) .......................... 2016 1 0150091

(51) Int. Cl.
*G06K 9/00* (2006.01)
(52) U.S. Cl.
CPC ....... *G06K 9/0004* (2013.01); *G06K 9/00053* (2013.01)

(58) Field of Classification Search
CPC .......................... G06K 9/0004; G06K 9/00053
See application file for complete search history.

(56) References Cited

U.S. PATENT DOCUMENTS

| 5,736,734 A * | 4/1998 | Marcus | G07C 9/37 250/225 |
| 10,002,281 B2 * | 6/2018 | Wu | G06K 9/0004 |
| 10,147,757 B2 * | 12/2018 | Lee | G06K 9/0004 |
| 10,387,710 B2 * | 8/2019 | Chen | G03H 1/0248 |
| 10,410,037 B2 * | 9/2019 | He | G06K 9/00046 |

(Continued)

FOREIGN PATENT DOCUMENTS

| CN | 203405831 U | 7/2013 |
| CN | 203405831 U | 1/2014 |

(Continued)

OTHER PUBLICATIONS

International Search Report from PCT/CN2016/0958222 dated Nov. 30, 2016.

(Continued)

*Primary Examiner* — Utpal D Shah
(74) *Attorney, Agent, or Firm* — Adsero IP (57) ABSTRACT

An optical fingerprint module, comprising: a protective layer; an optical fingerprint sensor; a backlight source, said backlight source being located below the protective layer; the optical fingerprint sensor is stacked directly below the protective layer, or directly adhered to the bottom of the protective layer; the backlight source is located at a side of the optical fingerprint sensor. The present optical fingerprint module has a smaller size and better mechanical reliability.

12 Claims, 4 Drawing Sheets

(56) References Cited

U.S. PATENT DOCUMENTS

| | | | | |
|---|---|---|---|---|
| 10,438,046 B2* | 10/2019 | He | ............ | G06K 9/001 |
| 2004/0252867 A1* | 12/2004 | Lan | ............ | G06K 9/0004 |
| | | | | 382/124 |
| 2008/0123908 A1* | 5/2008 | Waldman | ............ | G06K 9/00046 |
| | | | | 382/124 |
| 2012/0321149 A1* | 12/2012 | Carver | ............ | G06K 9/0004 |
| | | | | 382/124 |
| 2016/0132712 A1* | 5/2016 | Yang | ............ | G06K 9/0002 |
| | | | | 348/77 |
| 2016/0247010 A1* | 8/2016 | Huang | ............ | G02B 5/20 |

FOREIGN PATENT DOCUMENTS

| | | |
|---|---|---|
| CN | 103699884 A | 4/2014 |
| CN | 204028936 | 12/2014 |
| CN | 104318204 | 1/2015 |
| CN | 204515797 | 7/2015 |
| CN | 104933421 | 9/2015 |

OTHER PUBLICATIONS

Office Action from Chinese Application No. 201610150091.6, dated Apr. 2, 2019 (with English Translation).

* cited by examiner

OPTICAL FINGERPRINT MODULE

CROSS-REFERENCE TO RELATED APPLICATIONS

The present application is the national phase of International Application No. PCT/CN2016/095822, filed on Aug. 18, 2016, which claims the benefit of priority to Chinese Patent Application No. 201610150091.6, filed on Mar. 16, 2016, and entitled "OPTICAL FINGERPRINT MODULE", the entire disclosures of which are incorporated herein by reference.

TECHNICAL FIELD

The present disclosure generally relates to optical fingerprint identification field, and more particularly, to an optical fingerprint module.

BACKGROUND

Fingerprint imaging recognition technology is used to realize identification by capturing fingerprint images of a person using fingerprint sensors or modules and then determining whether the fingerprint image information matches that already stored in a system. Due to its convenience in use and uniqueness of human fingerprints, the fingerprint recognition technology has been widely applied to various fields, such as security inspection field including Public Security Bureau (PSB) or the like, access control systems of buildings, consumption goods field including personal computers or mobile phones etc., and the like.

The fingerprint recognition technology may be realized by optical imaging, capacitance imaging, ultrasound imaging and the like, among which, the optical fingerprint recognition technology is advantageous in imaging quality and device cost.

Figure 1:
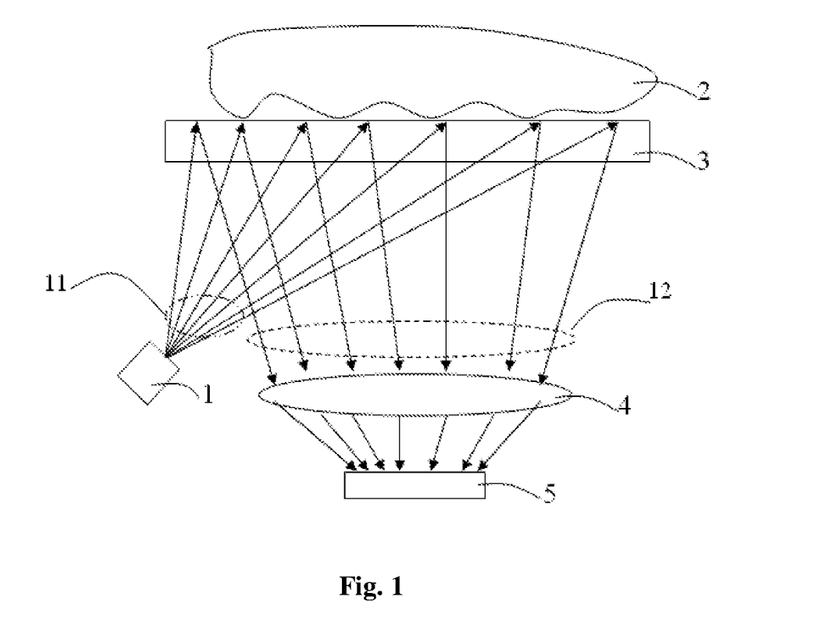
FIG. 1 schematically illustrates a structural diagram of an existing optical fingerprint module.

As shown in FIG. 1, an existing optical fingerprint module mainly includes a backlight source 1, a protective layer 3, a light focusing lens 4 and an optical fingerprint sensor 5. During capturing of a fingerprint image, a person puts a finger 2 on the protective layer 3, and output light 11 of the backlight source 1 irradiates to the protective layer 3, passes through the protective layer 3, and is partially reflected and transmitted at a contact interface between the finger 2 and the protective layer 3. The reflected light 12 is focused by the light focusing lens 4 and irradiates onto the optical fingerprint sensor 5. The optical fingerprint sensor 5 performs photoelectric conversion and signal processing to realize fingerprint image capturing. Since characteristics of a contact interface between the finger 2 and the protective layer 3 reflect fingerprint characteristics of the finger 2, and the characteristics of the contact interface directly affect characteristics of the reflected light 12, the image captured by the optical fingerprint sensor 5 reflects the fingerprint characteristics of the person.

More information on optical fingerprint modules may refer to the Chinese Utility Model Patent with a publication No. CN203405831U.

However, structures and performance of the existing optical fingerprint modules still remain to be improved.

SUMMARY

An optical fingerprint module is provided according to embodiments of the present disclosure, so as to reduce sizes of existing optical fingerprint modules, and to improve mechanical reliability performance of the existing optical fingerprint modules.

In some embodiment, the optical fingerprint module may include a protective layer, an optical fingerprint sensor, and a backlight source disposed below the protective layer, where the optical fingerprint sensor is directly stacked below the protective layer, or directly adhered to a bottom of the protective layer, and the backlight source is disposed at a side of the optical fingerprint sensor.

In some embodiment, the backlight source and the optical fingerprint sensor may be disposed at an interval.

In some embodiment, the optical fingerprint module may further include a first optical adhesive layer disposed between the optical fingerprint sensor and the protective layer, where light emitted from the backlight source enters the protective layer and is partially reflected on an upper surface of the protective layer, and the reflected light passes through the protective layer, enters the first optical adhesive layer, and enters the optical fingerprint sensor from the first optical adhesive layer.

In some embodiment, the backlight source may include at least one Light Emitting Diode (LED), and light emitted from the at least one LED may be near-ultraviolet light, violet light, blue light, green light, yellow light, red light, near-infrared light, or white light.

In some embodiment, the backlight source may include two or more LEDs, the two or more LEDs may be evenly distributed under the protective layer, and light emitted from the two or more LEDs may include near-ultraviolet light, violet light, blue light, green light, yellow light, red light, near-infrared light, or white light.

In some embodiment, the optical fingerprint module may further include a light focusing lens disposed in front of a light-emitting surface of the backlight source, where the light focusing lens is configured to adjust light emitted from the backlight source into parallel light or quasi-parallel light, and the light emitted from the backlight source first enters the light focusing lens and then enters the protective layer.

In some embodiment, the optical fingerprint module may further include a light anti-reflection layer disposed in an area of a lower surface of the protective layer closing to the backlight source, where the light anti-reflection layer is configured to increase a proportion of light emitted from the backlight source entering the protective layer.

In some embodiment, the optical fingerprint module may further include a non-opaque dielectric layer disposed between the protective layer and the backlight source, where light emitted from the backlight source enters the non-opaque dielectric layer first, and then enters the protective layer.

In some embodiment, a side surface or a lower surface of the non-opaque dielectric layer may be a light focusing surface, light emitted from the backlight source enters the non-opaque dielectric layer from the light focusing surface, and the light focusing surface is configured to adjust the light emitted from the backlight source into parallel light or quasi-parallel light.

In some embodiment, the optical fingerprint module may further include a second optical adhesive layer disposed between the protective layer and the non-opaque dielectric layer, where light emitted from the backlight source enters the second optical adhesive layer from the non-opaque dielectric layer, and then enters the protective layer from the second optical adhesive layer.

In some embodiment, the optical fingerprint module may further include a light anti-reflection layer disposed on a side surface or a lower surface of the non-opaque dielectric layer, where the light anti-reflection layer is configured to increase a proportion of light emitted from the backlight source entering the non-opaque dielectric layer.

In some embodiment, the non-opaque dielectric layer may be made of glass, plastic or optical adhesive.

In some embodiment, the non-opaque dielectric layer may have a refractive index of 1.2 or more.

In some embodiment, a light focusing surface of the non-opaque dielectric layer may include an oblique surface, a spherical crown surface, an ellipsoidal crown surface, a conical side surface or a pyramid side surface.

In some embodiment, the protective layer may have a single layer or multi-layer structure, and the optical fingerprint module may further include a light filtering layer disposed on at least one of an upper surface of the protective layer, a lower surface of the protective layer and an upper surface of the optical fingerprint sensor.

Compared with the prior art, the present disclosure has the following advantages.

In the optical fingerprint module, both the optical fingerprint sensor and the backlight source are disposed below the protective layer, and the optical fingerprint sensor is directly stacked under the protective layer or directly adhered to a bottom of the protective layer. There is no light focusing lens disposed between the optical fingerprint sensor and the protective layer, and thus there is no interval between the optical fingerprint sensor and the light focusing lens, or between the protective layer and the light focusing lens. Therefore, a size of the optical fingerprint module can be reduced, manufacturing process of the optical fingerprint module can be simplified, a yield rate can be improved, and cost can be reduced. Moreover, since there is no requirement for optical focusing, the mechanical reliability performance of the optical fingerprint module can be enhanced. Since the backlight source is disposed at a side of the optical fingerprint sensor, the light emitted from the backlight source can enter the protective layer without passing through the optical fingerprint sensor. Therefore, there will be more light reflected at an interface between a finger and an upper surface of the protective layer, and then there will be more reflected light passing through the protective layer and entering the optical fingerprint sensor, thereby increasing utilization of the light emitted from the backlight source and improving quality of the captured fingerprint images.

Further, the optical fingerprint module may further include a light anti-reflection layer disposed in an area of a lower surface of the protective layer closing to the backlight source. The light anti-reflection layer can increase a proportion of light emitted from the backlight source entering the protective layer, thereby further improving utilization of the light emitted from the backlight source and improving quality of the captured fingerprint images.

DETAILED DESCRIPTION

As described in the background art, in existing optical fingerprint sensors as shown in FIG. 1, a light focusing lens 4 is disposed between the protective layer 3 and the optical fingerprint sensor 5 resulting in the entire fingerprint imaging system having a large size. Moreover, in order to obtain a clear fingerprint image, relative distances among the light focusing lens 4, the optical fingerprint sensor 5 and the protective layer 3 of the system need to be strictly controlled, so that the optical sensor 5 captures an image at the contact interface between the finger 2 and the protective layer 3. However, existence of these distances, especially a distance between the light focusing lens 4 and the optical fingerprint sensor 5, may result in that an external vibration has a great effect on the entire fingerprint imaging system, and thus the fingerprint imaging system has a poor mechanical reliability performance.

An optical fingerprint module is provided according to embodiments of the present disclosure. In the optical fingerprint module, both the optical fingerprint sensor and the backlight source are disposed under the protective layer, and the optical fingerprint sensor is directly stacked under the protective layer or directly adhered to a bottom of the protective layer. There is no light focusing lens disposed between the optical fingerprint sensor and the protective layer, and thus there is no space between the optical fingerprint sensor and the light focusing lens, or between the protective layer and the light focusing lens. Therefore, a size of the optical fingerprint module can be reduced, manufacturing process of the optical fingerprint module can be simplified, a yield rate can be improved, and cost can be reduced. Moreover, the backlight source is disposed at a side of the optical fingerprint sensor, so that the light emitted from the backlight source can enter the protective layer without passing through the optical fingerprint sensor, and thus more light will be reflected at an interface between a finger and an upper surface of the protective layer, and then there will be more reflected light passing through the protective layer and entering the optical fingerprint sensor, thereby improving quality of the captured fingerprint images.

In order to make the above objects, features, and advantages of the present disclosure more apparent, specific embodiments of the present disclosure will be described in detail below with reference to the accompanying drawings.

Figure 2:
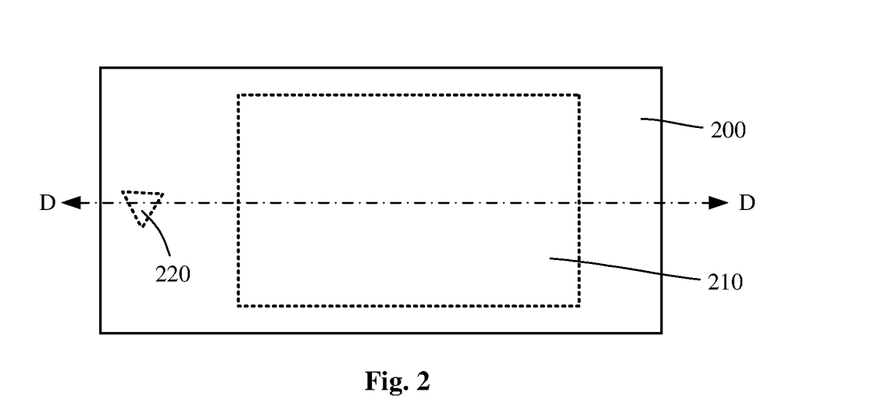
FIG. 2 schematically illustrates a top view of an optical fingerprint module according to a first embodiment of the present disclosure.
Figure 3:
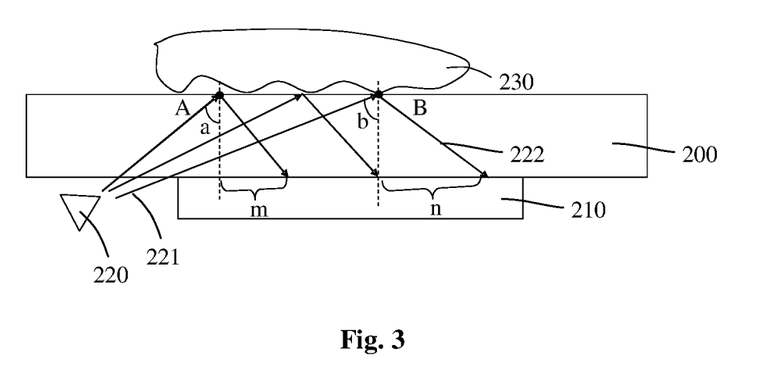
FIG. 3 schematically illustrates a cross-sectional view of the optical fingerprint module according to the first embodiment of the present disclosure.

An optical fingerprint module is provided according to a first embodiment of the present disclosure. With reference to FIGS. 2 and 3, FIG. 2 schematically illustrates a top view of the optical fingerprint module, FIG. 3 schematically illustrates a cross-sectional view of the optical fingerprint module along a line DD in FIG. 2. The optical fingerprint module may include a protective layer 200, an optical fingerprint sensor 210 and a backlight source 220. The backlight source 220 is disposed below the protective layer 200, the optical fingerprint sensor 210 is directly stacked below the protective layer 200, and the backlight source 220 is disposed at a side of the optical fingerprint sensor 210.

It should be noted that, the optical fingerprint sensor 210 and the backlight source 220 are shown as dashed lines in FIG. 2, because they are actually covered by the protective layer 200. In other embodiments, the protective layer 200 may not cover the backlight source 220 in a top view direction.

As shown in FIG. 3, in some embodiment, the backlight source 220 is disposed at a left side of the optical fingerprint sensor 210, and the backlight source 220 is disposed at an approximately same level with the optical fingerprint sensor 210. In other embodiments, the backlight source 220 may be disposed at another side of the optical fingerprint sensor 210, or the backlight source 220 may be disposed below a side of (i.e. obliquely below) or above a side of (i.e. obliquely above) the optical fingerprint sensor 210. However, when the backlight source 220 is disposed obliquely below the optical fingerprint sensor 210, an interval between the backlight source 220 and the optical fingerprint sensor 210 may be appropriately controlled so as to control a size of the entire optical fingerprint module.

It can be seen from the above that in embodiments of the present disclosure, it is required that the backlight source 220 and the optical fingerprint sensor 210 are disposed under the protective layer 200, and the backlight source 220 is disposed at a side of the optical fingerprint sensor 210, and the backlight source 220 disposed on the side of the optical fingerprint sensor 210 may be lower or higher than the optical fingerprint sensor 210. However, the backlight source 220 should not be disposed right below the optical fingerprint sensor 210, because the requirement of the backlight source 220 being disposed at the side of the optical fingerprint sensor 210 will not be satisfied. An area right below the optical fingerprint sensor 210 means an area covered by the optical fingerprint sensor 210 in a top view direction. When the backlight source 220 is disposed at a side of the optical fingerprint sensor 210 rather than right below the optical fingerprint sensor 210, the light emitted from the backlight source 220 can enter the protective layer 200 without passing through the optical fingerprint sensor 210. On the other hand, since the backlight source 220 is disposed at a side of the optical fingerprint sensor 210, a projection of the backlight source 220 and a projection of the optical fingerprint sensor 210 on a horizontal plane will not be overlapped with each other and can be simultaneously seen in FIG. 2. If the backlight source 220 is disposed right below the optical fingerprint sensor 210, the backlight source 220 will be covered by the optical fingerprint sensor 210 and projections of the backlight source 220 and the optical fingerprint sensor 210 on a horizontal plane will be overlapped.

When the backlight source 220 is disposed at a side of the optical fingerprint sensor 210, the backlight source 220 may not include a light guide plate or the like. Referring to FIG. 3, when the backlight source 220 is disposed at a side of the optical fingerprint sensor 210, it is not necessary for the light emitted from the backlight source 220 to pass through the optical fingerprint sensor 210 or other structures that block light before reaching the protective layer 200, but the light emitted from the backlight source 220 can reach the protective layer 200 via air or vacuum, or via a specially designed dielectric layer that facilitates light propagation, for example, a light anti-reflection layer or a non-opaque dielectric layer which will be described in the following description. Therefore, more light emitted from the backlight source 220 can be used for fingerprint image capturing, which is beneficial to obtain better fingerprint images and to reduce a size of the optical fingerprint module.

In some embodiment, the optical fingerprint sensor 210 may be directly stacked below the protective layer 200 without being adhered to the protective layer 200. Herein, the "directly below" means that the optical fingerprint sensor 210 and the protective layer 200 are at least partially contacted. When both the optical fingerprint sensor 210 and the protective layer 200 are flat substrates, they may be stacked in a form as shown in FIG. 3.

It should be noted that, in other embodiments, the optical fingerprint sensor 210 may be adhered to a bottom of the protective layer 200, and a first optical adhesive layer (not shown) may be disposed between the optical fingerprint sensor 210 and the protective layer 200. That is, the optical fingerprint sensor 210 may be adhered to the bottom of the protective layer 200 via the first optical adhesive layer. The light emitted from the backlight source 220 first enters the protective layer 200, and is partially reflected and refracted on an upper surface of the protective layer 200. The reflected light returns to the protective layer 200, passes through the protective layer 200 and enters the first optical adhesive layer, and then enters the optical fingerprint sensor 210. The first optical adhesive layer may be a thermosensitive optical adhesive layer, a lightsensitive optical adhesive layer or an optical double sided adhesive.

In some embodiment, there is an interval (not annotated in FIG. 3) between the backlight source 220 and the optical fingerprint sensor 210, to ensure that the backlight source 220 is not directly contacted with the optical fingerprint sensor 210. A size of the interval may be determined based on design requirements. For example, the interval may be greater than or equal to a width of the backlight source 220.

In some embodiment, an angle between the light emitted from the backlight source 220 and an area of the upper surface of the protective layer 200 used for contact with fingerprints may be an acute angle. Then, light emitted from the backlight source 220 can be partially reflected on an interface between the upper surface of the protective layer 200 and fingerprints, the incident light at different reflection points of the interface may have different offsets, and most of effective reflected light may enter photosensitive regions of the optical fingerprint sensor 210. The offset refer to a distance between a reflected light and a corresponding normal line along a horizontal direction of FIG. 3, and most of the effective reflected light may enter photosensitive pixels with approximately the same offsets as the reflected light. Therefore, the entire optical fingerprint module can realize fingerprint image recognition and form clear fingerprint images without a structure like a light guide plate or a light focusing lens and so on. The structure of the optical fingerprint module can be simplified, and the cost can be reduced.

In some embodiment, the backlight source 220 may be a point light source, such as a Light Emitting Diode (LED). Light emitted from the LED may be near-ultraviolet light, violet light, blue light, green light, yellow light, red light, near-infrared light or white light. In other embodiments, the backlight source 220 may include two or more LEDs.

In some embodiment, the protective layer 200 may have a single layer structure. That is, the protective layer 200 may be a substrate as shown in FIG. 3. In other embodiments, the protective layer 200 may have a multilayer structure. Although not shown in FIGS. 2 and 3, a light filtering layer may be disposed on at least one of an upper surface of the protective layer 200, a lower surface of the protective layer 200, and an upper surface of the optical fingerprint sensor 210, no matter a single layer structure or a multilayer structure the protective layer 200 has. It should be noted that, when the protective layer 200 has a multilayer structure, an upper surface and a lower surface of the protective layer 200 may refer to an upper surface and a lower surface of each layer of the multiple layers. The light filtering layer may be used to filter ambient light or to change an appearance color of the protective layer 200 or to change an appearance color of the optical fingerprint sensor 210.

In some embodiment, the optical fingerprint sensor 210 may be an image sensor fabricated by a Complementary Metal Oxide Semiconductor (CMOS) process based on a silicon wafer, or an image sensor fabricated by a Thin Film Transistor (TFT) process based on a glass substrate.

In the optical fingerprint module according to embodiments of the present disclosure, both the optical fingerprint sensor 210 and the backlight source 220 are disposed under the protective layer 200, and the optical fingerprint sensor 210 is directly stacked under the protective layer 200 or directly adhered to a bottom of the protective layer 200. There is no light focusing lens disposed between the optical fingerprint sensor 210 and the protective layer 200, and thus there is no interval between the optical fingerprint sensor 210 and the light focusing lens, or between the protective layer 200 and the light focusing lens. Therefore, a size of the optical fingerprint module can be reduced, manufacturing process of the optical fingerprint module can be simplified, a yield rate can be improved, and cost can be reduced. Moreover, since there is no requirement for optical focusing, the mechanical reliability performance of the optical fingerprint module can be enhanced. Since the backlight source 220 is disposed at a side of the optical fingerprint sensor 210, the light emitted from the backlight source 220 can enter the protective layer 200 without passing through the optical fingerprint sensor 210. Therefore, there will be more light reflected at an interface between the finger 230 and the upper surface of the protective layer 200, and then there will be more reflected light returning to the protective layer 200, passing through the protective layer 200 and entering the optical fingerprint sensor 210, thereby increasing utilization of the light emitted from the backlight source 220 and improving quality of fingerprint images.

Differently from the existing fingerprint imaging systems, according to embodiments of the present disclosure, the optical focusing lens is not included or is omitted in the optical fingerprint module, the optical fingerprint sensor 210 is closely disposed below the protective layer 200, and the backlight source 220 is disposed at a side of the optical fingerprint sensor 210, so that a size of the optical fingerprint module can be reduced, and the optical fingerprint sensor module becomes thinner and lighter.

Figure 4:
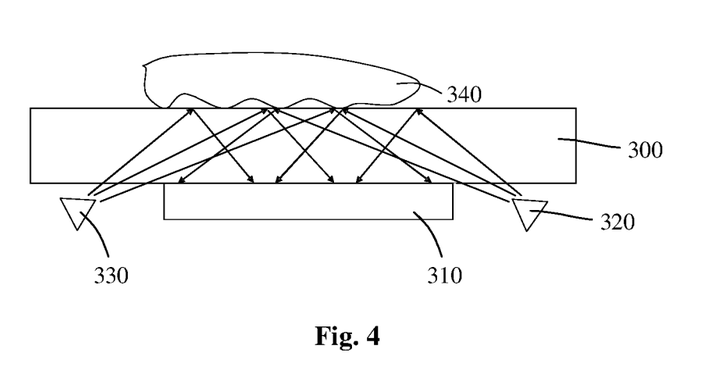
FIG. 4 schematically illustrates a cross-sectional view of an optical fingerprint module according to a second embodiment of the present disclosure.

An optical fingerprint module is provided according to a second embodiment. Referring to FIG. 4, FIG. 4 schematically illustrates a cross-sectional view of the optical fingerprint module. The optical fingerprint module may include a protective layer 300, an optical fingerprint sensor 310 and a backlight source. An upper surface of the protective layer 300 may be used for contact and pressing of a finger 340. The backlight source may be disposed below the protective layer 300, and the optical fingerprint sensor 310 may be directly adhered to a bottom of the protective layer 300. The backlight source may be disposed on more than one side of the optical fingerprint sensor 310.

With reference to FIG. 3 of the foregoing embodiment, since light emitted from the point light source such as an LED has a certain divergence angle, output light 221 of the backlight source 220 and its corresponding reflected light 222 cannot be considered as parallel light. That is, angles of light emitted from the backlight source 220 that irradiates to the upper surface of the protective layer 200 may vary greatly. For example, a first reflection point A is closer to the backlight source 220, an incident angle a of a first incident light 221 at the first reflection point A is small, and a horizontal offset of a first reflected light 222 corresponding to the first incident light 221 is small as well. In contrast, a second reflection point B is farther from the backlight source 220, an incident angle b of a second incident light 221 at the second reflection point B is large, and a horizontal offset of a second reflected light 222 corresponding to the second incident light 221 is large as well. Angles of the reflected light 222 at the two reflection points A and B being different may result in that, the first reflected light 222 at the reflection point A enters a pixel with a smaller offset m, and the second reflected light 222 at the reflection point B enters a pixel with a larger offset n, thereby causing distortion of the captured fingerprint images.

In order to solve the above-described distortion of the captured fingerprint images, as shown in FIG. 4, in some embodiment, the backlight source may include four LEDs. Only two of the four LEDs are shown in the cross-sectional view of FIG. 4, including an LED 320 and an LED 330 respectively. The four LEDs may be evenly distributed under the protective layer. For example, when the optical fingerprint sensor 310 has four sides, the four LEDs may be evenly distributed at the four sides of the optical fingerprint sensor 310, or the four lights may be evenly distributed at four corners of the optical fingerprint sensor 310. Light emitted by the four LEDs may each be non-parallel light. However, image distortion due to the non-parallel light can be corrected by using the four LEDs. Specifically, the four LEDs may be applied to capturing images in sequence, and the image distortion may be corrected by image processing, so as to improve quality of the captured fingerprint image and accuracy of fingerprint recognition.

In other embodiments, when a top view of the optical fingerprint sensor 310 is in a shape of a regular polygon, the plurality of LEDs may be uniformly distributed in a region surrounding the optical fingerprint sensor 310 in a central symmetry or axial symmetry manner with respect to a center of a top view of the optical fingerprint sensor 310, so that the plurality of LEDs are evenly distributed below the protective layer. Intervals between adjacent LEDs may be equal.

In some embodiment, an angle between light emitted from the backlight source and an area of an upper surface of the protective layer 300 for contacting fingerprints may be an acute angle.

In some embodiment, light emitted from the LED 320 and the LED 330 may be near-ultraviolet light, violet light, blue light, green light, yellow light, red light, near-infrared light or white light.

In other embodiments, the backlight source may include two LEDs, and the two LEDs may be evenly distributed below the protective layer. For example, one of the two LEDs may be disposed at a left side of the optical fingerprint sensor 310, the other LED may be disposed at a right side of the optical fingerprint sensor 310, and the two LEDs may capture images in turn. In other embodiments, the backlight source may include three or more LEDs, and the three or more LEDs may be evenly distributed under the protective layer, and may be used in turn to capture images.

For more details on the structure and advantages of the optical fingerprint sensor module in this embodiment, reference may be made to corresponding description of the foregoing embodiments.

Figure 5:
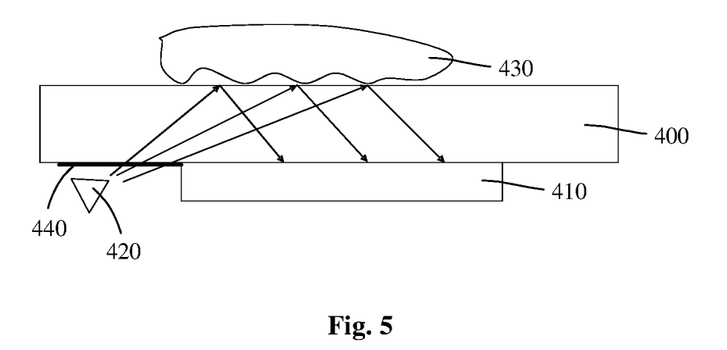
FIG. 5 schematically illustrates a cross-sectional view of an optical fingerprint module according to a third embodiment of the present disclosure.

An optical fingerprint module may be provided according to a third embodiment of the present disclosure. Referring to FIG. 5. FIG. 5 schematically illustrates a cross-sectional view of the optical fingerprint module. The optical fingerprint module may include a protective layer 400, an optical fingerprint sensor 410, and a backlight source 420. An upper surface of the protective layer 400 may be used for contact and pressing of a finger 430. The backlight source 420 may be disposed below the protective layer 400, and the optical fingerprint sensor 410 may be directly adhered to a bottom of the protective layer 400. The backlight source 420 may be disposed at a side of the optical fingerprint sensor 410.

In some embodiment, the optical fingerprint module may further include a light anti-reflection layer 440 disposed in an area of a lower surface of the protective layer 400 closing to the backlight source 420. The light anti-reflection layer 440 may be disposed in an area of the lower surface of the protective layer 400 that is directly irradiated by the backlight source 420. The light anti-reflection layer 440 is configured to increase a proportion of light emitted from the backlight source 420 entering the protective layer 400. Compared with the embodiment shown in FIG. 3, the light anti-reflection layer 440 disposed on a portion of the lower surface (i.e. an incident surface of light emitted from the backlight 420 source that enters the protective layer) of the protective layer 400 as shown in FIG. 5 can increase a proportion of light entering the protective layer 400.

For more details on the structure and advantages of the optical fingerprint sensor module provided in this embodiment, reference may be made to the corresponding discription of the foregoing embodiments.

Figure 6:
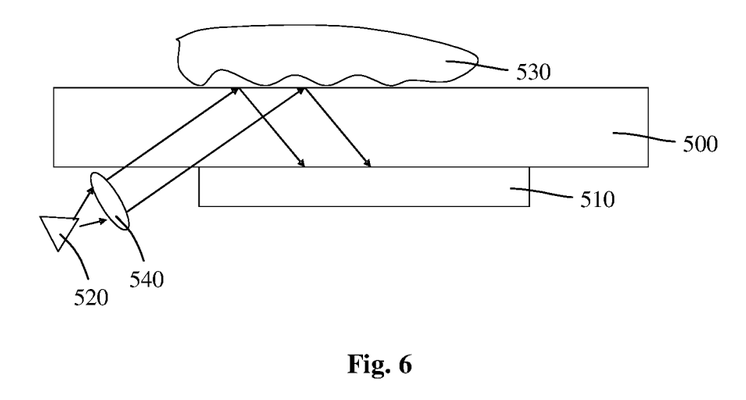
FIG. 6 schematically illustrates a cross-sectional view of an optical fingerprint module according to a fourth embodiment of the present disclosure.

An optical fingerprint module may be provided according to a fourth embodiment of the present disclosure. Referring to FIG. 6. FIG. 6 schematically illustrates a cross-sectional view of the optical fingerprint module. The optical fingerprint module may include a protective layer 500, an optical fingerprint sensor 510 and a backlight source 520. An upper surface of the protective layer 500 may be used for contact and pressing of a finger 530. The backlight source 520 may be disposed below the protective layer 500, and the optical fingerprint sensor 510 may be directly stacked below the protective layer 500. The backlight source 520 may be disposed at a side of the optical fingerprint sensor 510.

In some embodiment, the optical fingerprint module may further include a light focusing lens 540 disposed in front of a light-emitting surface of the backlight source 520. The light focusing lens 540 is configured to adjust light emitted from the backlight source 520 into parallel light or quasi-parallel light. Light emitted from the backlight source 520 may first enter the light focusing lens 540 and then enter the protective layer 500.

The light focusing lens 540 can adjust the incident light entering the protective layer 500 into parallel light or quasi-parallel light, thereby solving the problem of fingerprint image distortion.

For more details on the structure and advantages of the optical fingerprint module provided in this embodiment, reference may be made to corresponding descriptions of the foregoing embodiments.

Figure 7:
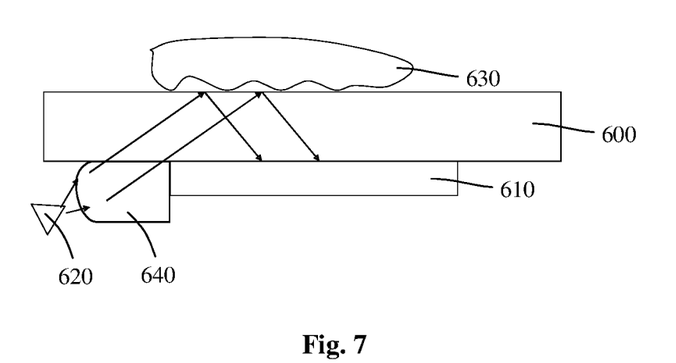
FIG. 7 schematically illustrates a cross-sectional view of an optical fingerprint module according to a fifth embodiment of the present disclosure.

An optical fingerprint module is provided according to a fifth embodiment of the present disclosure. Referring to FIG. 7, FIG. 7 schematically illustrates a cross-sectional view of the optical fingerprint module. The optical fingerprint module may include a protective layer 600, an optical fingerprint sensor 610 and a backlight source 620. An upper surface of the protective layer 600 may be used for contact and pressing of a finger 630. The backlight source 620 may be disposed below the protective layer 600, and the optical fingerprint sensor 610 may be directly stacked below the protective layer 600. The backlight source 620 may be disposed at a side of the optical fingerprint sensor 610.

In some embodiment, the optical fingerprint module may further include a non-opaque dielectric layer 640 disposed between the protective layer 600 and the backlight source 620. Light emitted from the backlight source 620 first enters the non-opaque dielectric layer 640 and then enters the protective layer 600.

In some embodiment, a side surface of the non-opaque dielectric layer 640 may be a light focusing surface (not annotated in FIG. 7), and light emitted from the backlight source 620 enters the non-opaque dielectric layer 640 from the light focusing surface. The light focusing surface is configured to adjust the light emitted from the backlight source 620 into parallel light or quasi-parallel light so as to improve quality of fingerprint images. In other embodiments, a lower surface of the non-opaque dielectric layer 640 may be a light focusing surface, or both the lower surface and a side surface of the non-opaque dielectric layer 640 may be light focusing surfaces. The light focusing surface may include an oblique surface, a spherical crown surface, an ellipsoidal crown surface, a conical side surface or a pyramid side surface. Some of the light focusing surfaces can adjust the light into parallel light or quasi-parallel light, where the quasi-parallel light refers to angle differences between light rays are less than 10 degrees. Specifically, curved surfaces that can enhance light focusing effect include spherical crown surface and the ellipsoidal crown surface etc. and may be applied to adjusting light into parallel light or quasi-parallel light, so as to solve the image distortion problem.

In this embodiment, although not shown in FIG. 7, the optical fingerprint module may further include a second optical adhesive layer disposed between the protective layer 600 and the non-opaque dielectric layer 640, and light emitted from the backlight source 620 first enters the second optical adhesive layer from the non-opaque dielectric layer 640 and then enters the protective layer 600 from the second optical adhesive layer.

In some embodiment, the non-opaque dielectric layer 640 may be made of glass, plastic or optical adhesive. The non-opaque dielectric layer 640 may have a refractive index of 1.2 or more. The non-opaque dielectric layer 640 can increase an incident angle of the light emitted from the backlight source 620 at an interface between an upper surface of the protective layer 600 and air. When the incident angle is increased to a certain angle, the light emitted from the backlight source 620 can be totally reflected at the interface between the upper surface of the protective layer 600 and air. However, a total reflection may not occur at an interface between the upper surface of the protective layer 600 and the finger 630 at the same incident angle, and thus the light reflected at the interface between the upper surface of the protective layer 600 and the finger 630 can be normally used for fingerprint image capturing. Since a refractive index of finger skin is larger than air, an incident angle of the light emitted from the backlight source 620 may be limited within a certain range, so that a total reflection occurs at the interface between the upper surface of the protective layer 600 and air, but does not occur at the interface between the upper surface of the protective layer 600 and the finger skin. In this way, signal contrast between ridge contact points and valley reflection points (i.e. the interface between the upper surface of the protective layer 600 and air) of the finger skin can be increased, thereby improving image quality. Therefore, by selecting the non-opaque dielectric layer 640 with a refractive index of 1.2 or more, most of the light entering the protective layer 600 can finally enter the optical fingerprint sensor 610, and more light can be used for fingerprint imaging. The captured fingerprint image will be clearer, and light utilization of the backlight 620 source can be improved.

It should be noted that, in other embodiments, the optical fingerprint module may further include a light anti-reflection layer disposed on a side surface or a lower surface of the non-opaque dielectric layer 640. The light anti-reflection layer is configured to increase a proportion of light emitted from the backlight source 620 entering the non-opaque dielectric layer 640, thereby increasing fingerprint image signals.

For more details on the structure and advantages of the optical fingerprint module provided in this embodiment, reference may be made to the corresponding description of the foregoing embodiments.

Although the present disclosure has been disclosed above, the present disclosure is not limited thereto. Any changes and modifications may be made by those skilled in the art without departing from the spirit and scope of the disclosure, and the scope of the disclosure should be determined by the scope of the claims.

The invention claimed is:

1. An optical fingerprint module, comprising:
a protective layer;
an optical fingerprint sensor; and
a backlight source, disposed below the protective layer;
wherein the optical fingerprint sensor is directly stacked below the protective layer, or directly adhered to a bottom of the protective layer;
wherein the backlight source is disposed at a side of the optical fingerprint sensor;
wherein the optical fingerprint module further comprises a non-opaque dielectric layer disposed between the protective layer and the backlight source, wherein light emitted from the backlight source enters the non-opaque dielectric layer first, and then enters the protective layer;
wherein a side surface or a lower surface of the non-opaque dielectric layer is a light focusing surface, the light emitted from the backlight source enters the non-opaque dielectric layer from the light focusing surface, and the light focusing surface is configured to adjust the light emitted from the backlight source into parallel light or quasi-parallel light.

2. The optical fingerprint module according to claim 1, wherein the backlight source and the optical fingerprint sensor are disposed at an interval.

3. The optical fingerprint module according to claim 1, further comprising: a first optical adhesive layer disposed between the optical fingerprint sensor and the protective layer, wherein light emitted from the backlight source enters the protective layer and is partially reflected on an upper surface of the protective layer, and the reflected light passes through the protective layer, enters the first optical adhesive layer, and enters the optical fingerprint sensor from the first optical adhesive layer.

4. The optical fingerprint module according to claim 1, wherein the backlight source comprises at least one Light Emitting Diode (LED), and light emitted from the at least one LED comprises near-ultraviolet light, violet light, blue light, green light, yellow light, red light, near-infrared light, or white light.

5. The optical fingerprint module according to claim 1, wherein the backlight source comprises two or more LEDs, the two or more LEDs are evenly distributed below the protective layer, and light emitted from the two or more LEDs comprises near-ultraviolet light, violet light, blue light, green light, yellow light, red light, near-infrared light, or white light.

6. The optical fingerprint module according to claim 1, further comprising: a light anti-reflection layer disposed in an area of a lower surface of the protective layer closing to the backlight source, wherein the light anti-reflection layer is configured to increase a proportion of light emitted from the backlight source entering the protective layer.

7. The optical fingerprint module according to claim 1, further comprising: a second optical adhesive layer disposed between the protective layer and the non-opaque dielectric layer, wherein the light emitted from the backlight source enters the second optical adhesive layer from the non-opaque dielectric layer, and enters the protective layer from the second optical adhesive layer.

8. The optical fingerprint module according to claim 7, further comprising: a light anti-reflection layer disposed on a side surface or a lower surface of the non-opaque dielectric layer, wherein the light anti-reflection layer is configured to increase a proportion of light emitted from the backlight entering the non-opaque dielectric layer.

9. The optical fingerprint module according to claim 1, wherein the non-opaque dielectric layer is made of glass, plastic or optical adhesive.

10. The optical fingerprint module according to claim 9, wherein the non-opaque dielectric layer has a refractive index of 1.2 or more.

11. The optical fingerprint module according to claim 1, wherein a light focusing surface of the non-opaque dielectric layer comprises an oblique surface, a spherical crown surface, an ellipsoidal crown surface, a conical side surface or a pyramid side surface.

12. The optical fingerprint module according to claim 1, wherein the protective layer has a single layer or multi-layer structure, and the optical fingerprint module further comprises a light filtering layer disposed on at least one of an upper surface of the protective layer, a lower surface of the protective layer and an upper surface of the optical fingerprint sensor.

\* \* \* \* \*